(12) United States Patent
Lee et al.

(10) Patent No.: US 11,887,042 B2
(45) Date of Patent: Jan. 30, 2024

(54) SYSTEM AND METHOD FOR DELIVERY SERVICE USING DRONE

(71) Applicants: Hyundai Motor Company, Seoul (KR); Kia Motors Corporation, Seoul (KR)

(72) Inventors: Sang Heon Lee, Seoul (KR); Jin Ho Hwang, Cheonan-si (KR); Dong Eun Cha, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 157 days.

(21) Appl. No.: 17/168,740

(22) Filed: Feb. 5, 2021

(65) Prior Publication Data
US 2022/0101256 A1    Mar. 31, 2022

(30) Foreign Application Priority Data
Sep. 29, 2020    (KR) .................... 10-2020-0126889

(51) Int. Cl.
| | | |
|---|---|---|
| G06Q 10/0834 | (2023.01) | |
| B64C 39/02 | (2023.01) | |
| G06Q 10/0832 | (2023.01) | |
| B64U 70/00 | (2023.01) | |
| B64U 80/86 | (2023.01) | |
| B64U 101/60 | (2023.01) | |

(52) U.S. Cl.
CPC ....... *G06Q 10/0834* (2013.01); *B64C 39/024* (2013.01); *G06Q 10/0832* (2013.01); *B64U 70/00* (2023.01); *B64U 80/86* (2023.01); *B64U 2101/60* (2023.01); *B64U 2201/10* (2023.01)

(58) Field of Classification Search
CPC ............ G06Q 10/0834; G06Q 10/0832; B64C 39/024; B64U 2201/10; B64U 80/86; B64U 70/00; B64U 2101/60
See application file for complete search history.

(56) References Cited

U.S. PATENT DOCUMENTS

| | | | |
|---|---|---|---|
| 2013/0179205 A1* | 7/2013 | Slinin ................... | G06Q 10/06 705/7.13 |
| 2017/0011340 A1* | 1/2017 | Gabbai ............... | G08G 5/0034 |

(Continued)

FOREIGN PATENT DOCUMENTS

| | | | | |
|---|---|---|---|---|
| KR | 101950996 B1 | 2/2019 | | |
| WO | WO 2019/117908 A1 * | 6/2019 | ............ | G06Q 50/30 |

OTHER PUBLICATIONS

Microsoft Computer Dictionary, Fifth Edition, Microsoft Press, Redmond, Washington, 2002, pp. front cover, title page, copyright page, and 474.*

(Continued)

*Primary Examiner* — Nathan Erb
(74) *Attorney, Agent, or Firm* — Slater Matsil, LLP

(57) ABSTRACT

A system for a delivery service includes a server having delivery information on a delivery, drone information on a drone to be used for the delivery, and vehicle information on a vehicle that the drone is to board. The server is configured to control the drone through the delivery information, the drone information, and the vehicle information to board and travel on the vehicle, to pick up a package to be delivered or to depart the vehicle to deliver the package to a delivery destination.

13 Claims, 2 Drawing Sheets

(56) References Cited

U.S. PATENT DOCUMENTS

| | | | |
|---|---|---|---|
| 2017/0160735 A1* | 6/2017 | Mikan | G08G 1/205 |
| 2017/0293884 A1* | 10/2017 | Cheatham, III | G01B 21/02 |
| 2018/0016027 A1* | 1/2018 | Cheatham, III | G06Q 30/0284 |
| 2018/0037322 A1* | 2/2018 | Buchmueller | G06Q 50/28 |
| 2019/0196512 A1* | 6/2019 | Blake | G06Q 50/30 |
| 2020/0151637 A1* | 5/2020 | Gupta | G06Q 30/08 |
| 2020/0286033 A1* | 9/2020 | Ur | G06Q 10/08355 |

OTHER PUBLICATIONS

Poikonen, Stefan, Hybrid Routing Models Utilizing Trucks or Ships to Launch Drones, University of Maryland, 2018.*

* cited by examiner

SYSTEM AND METHOD FOR DELIVERY SERVICE USING DRONE

CROSS-REFERENCE TO RELATED APPLICATIONS

This application claims the benefit of Korean Patent Application No. 10-2020-0126889, filed on Sep. 29, 2020, which application is hereby incorporated herein by reference.

TECHNICAL FIELD

The present invention relates to a system and a method for a delivery service using a drone.

BACKGROUND

An existing package delivery system is a system in which when a customer makes a request for package delivery, a delivery agent visits a delivery request place and takes the package to a distribution center, and the delivery agent reclassifies the package according to a destination in the distribution center and delivers the package accordingly.

In this system, it is inconvenient for the delivery agent to visit the delivery request place of every customer. In addition, it takes a considerable amount of time and decreases efficiency for the delivery agent to reclassify the package in the distribution center, and deliver the package to a warehouse near the destination or to the destination by loading the package in a distribution vehicle and visiting the destination.

In addition, conventionally, by using public transportation such as an express bus, an intercity bus, etc., a customer sends a package manually at a departure time of the public transportation and a person who will receive the package receives the package manually in the terminal at an arrival time of the public transportation. This is unsystematic and is just a prescriptive process.

In the meantime, delivering a package by using only a drone has limitation in terms of meeting overall demands and has other problems, for example, noise or an accident occurs as a number of drones fly.

Therefore, there has been a need for the development of an efficient delivery service system for delivering a package by operating a drone additionally while using as much as possible a means of transportation, such as public transportation which is already set in time and path.

The foregoing is intended merely to aid in the understanding of the background of the present invention, and is not intended to mean that the present invention falls within the purview of the related art that is already known to those skilled in the art.

SUMMARY

The present invention relates to a system and a method for a delivery service using a drone. Particular embodiments relate to a system and a method for a delivery service using a drone, wherein a package requested to be delivered is picked up by using the drone, and in combination with an existing public transportation system, the drone boards a vehicle, travels to a delivery destination, and departs the vehicle near the delivery destination so as to deliver the package to the delivery destination, whereby operation of the drone is minimized and delivery efficiency is increased, and a battery of the drone is charged when the drone is aboard the vehicle, whereby it is easy to maintain and manage the drone.

According to embodiments of the present invention, a system for a delivery service using a drone includes a server having delivery information on delivery, drone information on the drone to be used for delivery, and vehicle information on a vehicle that the drone is to board, and controlling the drone through the delivery information, the drone information, and the vehicle information such that the drone boards the vehicle and travels, a battery of the drone is charged by the vehicle, or the drone departs the vehicle to deliver a package to a delivery destination.

The delivery information may include information on a delivery request, the package, a delivery origin, or the delivery destination.

The drone information may include information on a position of the drone, a state of charge of the battery of the drone, a travel path of the drone, or whether the drone is aboard the vehicle.

The vehicle information may include information on a position of the vehicle, a travel path of the vehicle, or whether the vehicle is boarded by the drone.

When the server receives a delivery request, the server makes the drone aboard the vehicle positioned nearest to a delivery origin fly to the delivery origin and pick up the package.

After the drone picks up the package at a delivery origin, the server controls the drone such that the drone boards the vehicle heading to the delivery destination and travels.

When the drone that has picked up the package boards the vehicle and travels to the delivery destination, the server controls the drone such that the drone transfers to one or more vehicles and travels.

When the drone boards or departs the vehicle, the server controls the drone such that the drone boards or departs the vehicle while the vehicle stops.

When the server receives a delivery request from a designated user terminal, the server makes a request for paying a delivery deposit, and when the designated user terminal pays the delivery deposit, the server controls the drone aboard the vehicle such that the drone flies to a delivery origin.

The server may use image data or weight data collected by a camera or a weight sensor of the drone so as to calculate a delivery cost of the package, the server may request a designated user terminal to pay the delivery cost, and when the designated user terminal pays the delivery cost, the server controls the drone such that the drone picks up the package at a delivery origin.

When the drone finishes delivering the package to the delivery destination, the server controls the drone such that the drone boards a vehicle heading to an additional delivery origin positioned nearest to the delivery destination and travels, or such that the drone returns to a return place.

The return place may be a vehicle passing through a main point having many delivery requests or may be a drone stop at the main point having many delivery requests, and the battery of the drone may be charged at the return place.

According to an embodiment of the present invention, a method for a delivery service using a drone includes receiving a delivery request by a server, picking up a package at a delivery origin by the drone, boarding of the drone with the package that has been picked up, on a vehicle heading to a delivery destination, and flying of the drone from the vehicle and delivering the package to the delivery destination by the drone.

At the boarding of the drone with the package that has been picked up, on the vehicle heading to the delivery destination, a battery of the drone may be charged by the vehicle.

At the boarding of the drone with the package that has been picked up, on the vehicle heading to the delivery destination, the drone may transfer to one or more vehicles and may travel.

After the flying of the drone from the vehicle and the delivering of the package to the delivery destination by the drone, the method may further include returning of the drone to a return place.

According to the system and the method for the delivery service using the drone of embodiments of the present invention, the package requested to be delivered is picked up by using the drone, and in combination with the existing public transportation system, the drone boards the vehicle, travels to the delivery destination, and departs the vehicle near the delivery destination so as to deliver the package to the delivery destination, whereby operation of the drone can be minimized and delivery efficiency can be enhanced, and the battery of the drone is charged when the drone is aboard the vehicle, whereby it can be easy to maintain and manage the drone.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF ILLUSTRATIVE EMBODIMENTS

Figure 1:
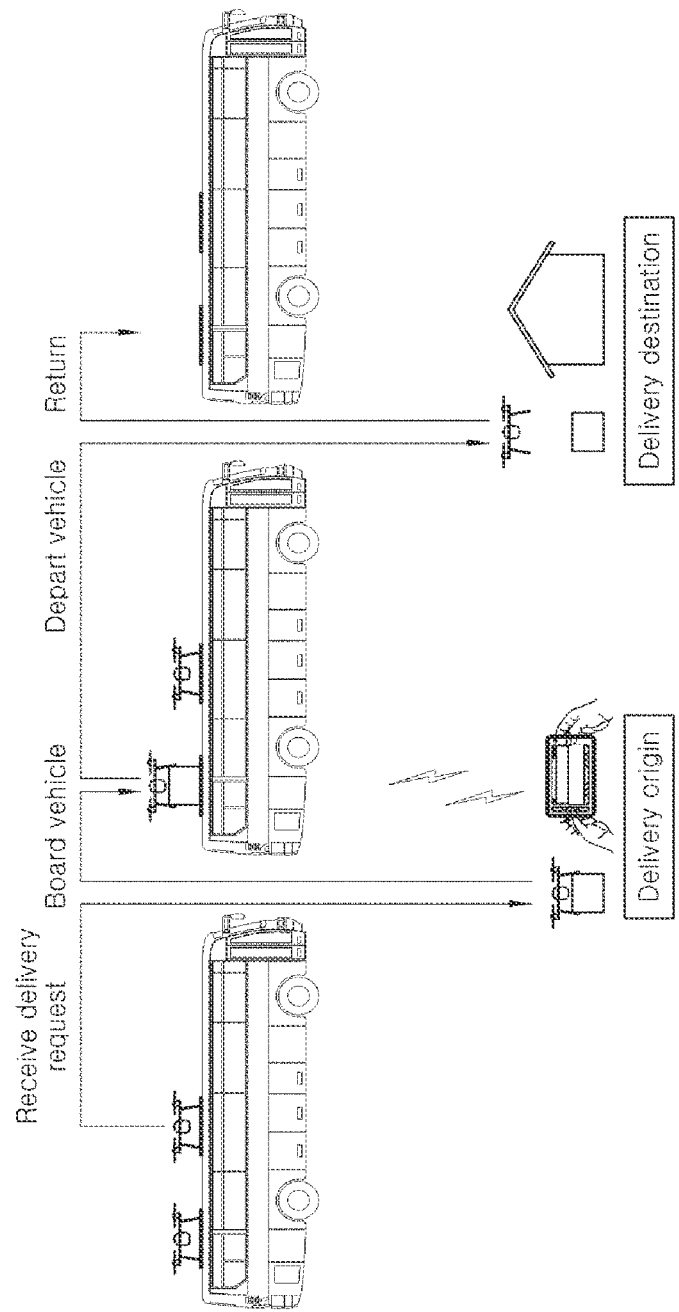
FIG. 1 is a diagram illustrating a system for a delivery service using a drone according to an embodiment of the present invention.

Hereinbelow, exemplary embodiments of the present invention will be described in detail with reference to the accompanying drawings. Throughout the drawings, the same reference numerals will refer to the same or like parts.

Figure 2:
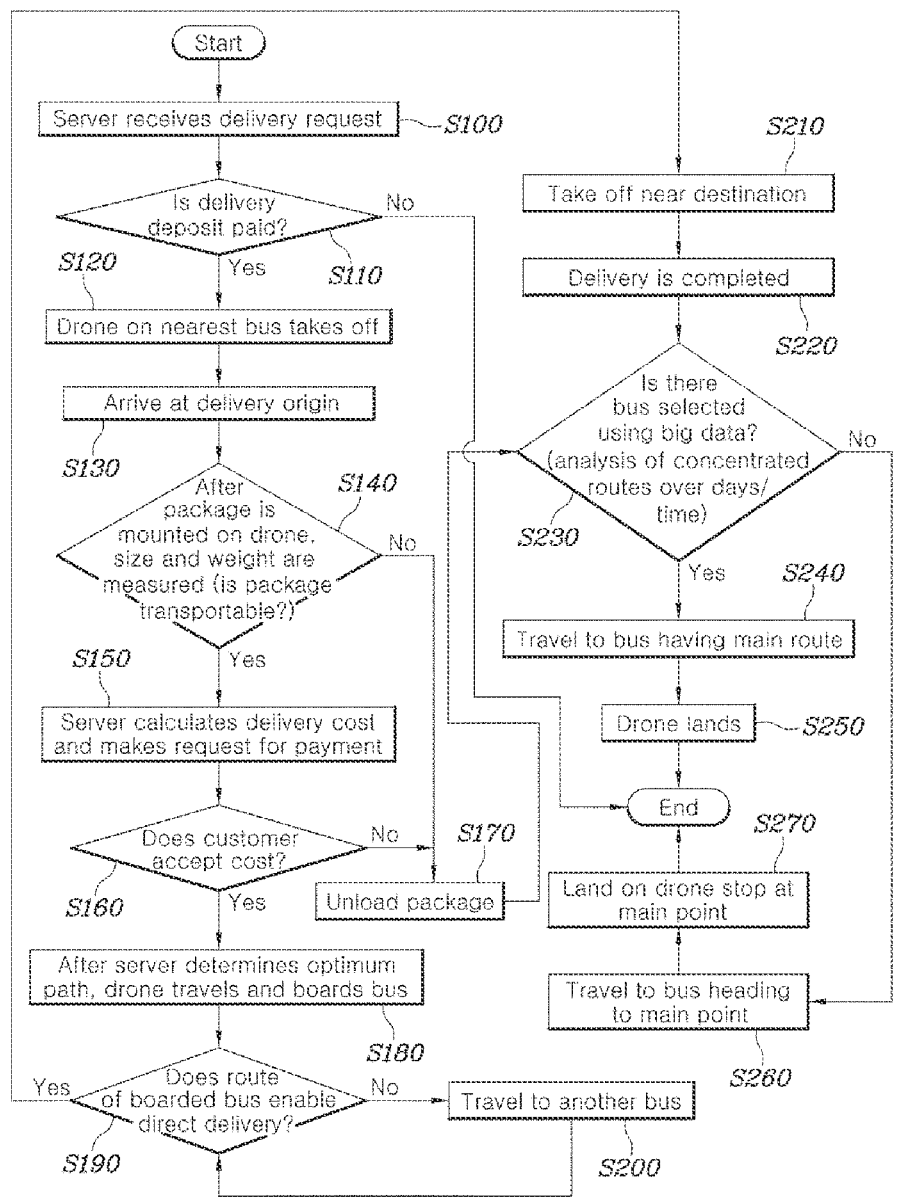
FIG. 2 is a flowchart illustrating a method for a delivery service using a drone according to an embodiment of the present invention.

FIG. 1 is a diagram illustrating a system for a delivery service using a drone according to an embodiment of the present invention. FIG. 2 is a flowchart illustrating a method for a delivery service using a drone according to an embodiment of the present invention.

FIG. 1 is a diagram illustrating a system for a delivery service using a drone according to an embodiment of the present invention. According to an embodiment of the present invention, a system for a delivery service using a drone includes a server having delivery information on delivery, drone information on the drone to be used for delivery, and vehicle information on a vehicle that the drone is to board, and controlling the drone through the delivery information, the drone information, and the vehicle information such that the drone boards the vehicle and travels, a battery of the drone is charged by the vehicle, or the drone departs the vehicle to deliver a package to a delivery destination. Herein, the system may consist of the server itself, or may consist of one or more drones and the server controlling the drones.

For example, one or more drones and one or more vehicles are provided. Each of the vehicles is provided with a space on which the one or more drones are able to mount or board. After the drone mounts or boards thereon, a battery of the drone is charged by the vehicle. According to an embodiment of the present invention, in the system for the delivery service using the drone, by using drone and vehicle information, the drone stands by on a roof of a vehicle traveling along a particular path or on a drone stop at a main point and the battery is charged. Further, when there is a delivery request, the drone on the vehicle passing through a place nearest to the delivery origin is controlled in such a manner as to take off and head to the delivery origin. After the drone picks up a package, the drone is made to mount or board a vehicle heading to the delivery destination. When the vehicle passes through the place nearest to the delivery destination, the drone is controlled in such a manner as to take off again and deliver the package to the delivery destination. Consequently, the problem caused by the drone is minimized by using a system for the existing public transportation, etc. and also by minimizing flight of the drone, thereby increasing the efficiency of the system for the delivery service.

In the meantime, the delivery information may include information on a delivery request, a package, a delivery origin, or a delivery destination. The drone information may include information on a position of a drone, the state of charge of a battery of a drone, a travel path of a drone, or whether a drone is aboard a vehicle. The vehicle information may include information on a position of a vehicle, a travel path of a vehicle, or whether a vehicle is boarded by a drone.

Specifically, the delivery information may include the following: information on a delivery request received from a user, information on a volume, a size, a content of a package, etc., and information on a delivery origin, a delivery destination, delivery urgency, a desired time for delivery of a package, etc. The drone information may include information on whether a drone is able to operate or a state of a battery, a distance that a drone is able to fly, a current position of a drone, etc. The vehicle may be public transportation such as a bus, and the like that have a fixed route or travel path. Specifically, the vehicle information may include information on a travel path of a vehicle or a route of a bus, a current position of a vehicle and an estimated position over time, whether a vehicle is mounted or boarded by a drone, whether a vehicle is able to charge a drone, etc.

In the meantime, according to an embodiment of the present invention, in the system for the delivery service using the drone, when the server receives the delivery request, the server makes the drone aboard the vehicle positioned nearest to the delivery origin fly to the delivery origin and pick up the package.

Specifically, a customer may apply for membership of a delivery service application in advance and may use the delivery service application to request delivery that uses the drone. The customer inputs the size and the weight of the package in advance to the delivery service application. The server determines whether the package is able to be delivered by the drone, and informs the customer about a result of determination. The vehicles, the buses, or the like continue traveling while circulating along designated paths. On the roof of the traveling vehicles or buses, drones are mounted or aboard and stand by. Afterwards, in the case where the package is able to be delivered by drone, the drone, among the one or more drones mounted on or aboard the vehicles or the buses, on the vehicle positioned nearest to a delivery request place for which the customer requests the package to be delivered is controlled in such a manner as to take off and head to the delivery request place.

In addition, according to an embodiment of the present invention, in the system for the delivery service using the drone, after the drone picks up the package at the delivery origin, the server controls the drone such that the drone boards the vehicle heading to the delivery destination and travels. The server selects the vehicle or the bus that heads to the delivery destination and that is positioned nearest to the delivery origin at which the drone has picked up the package. Then, the server identifies whether the vehicle or the bus has a space on which the drone is able to mount or board. When there is a space on which the drone is able to mount or board, the server controls the drone such that the drone which has picked up the package flies, boards the vehicle or the bus, and travels to the delivery destination. In addition, after the drone mounts or boards the vehicle or the bus, the battery of the drone is charged, whereby the time required for charging is minimized and the drone is always kept in a state of being able to fly.

In the meantime, according to an embodiment of the present invention, in the system for the delivery service using the drone, when the drone that has picked up the package boards the vehicle and travels to the delivery destination, the server controls the drone such that the drone transfers to one or more vehicles and travels. This means that like a person delivering a package by vehicle or bus, when there is no vehicle or bus directly heading to the delivery destination, the server uses a fixed travel path of a vehicle or a fixed route of a bus so as to set a path to deliver a package in the most efficient way, designates the vehicle or bus passing along the path, and controls the drone such that the drone transfers to the designated vehicle or bus and travels to the delivery destination. When there is no space for mounting or boarding on the roof of the vehicle or bus to which the drone is to transfer, the server controls the drone such that the drone lands on a drone stop at a main point near a transfer point and stands by.

In addition, according to an embodiment of the present invention, in the system for the delivery service using the drone, when the drone boards or departs the vehicle, the server controls the drone such that the drone boards or departs the vehicle while the vehicle stops. The drone is able to board or depart the vehicle or the bus while the vehicle or the bus is traveling. However, boarding or departing only when the vehicle or the bus stops due to waiting for traffic signals, traffic jams, or the like prevents accidents and traffic congestion.

In the meantime, according to an embodiment of the present invention, in the system for the delivery service using the drone, when the server receives a delivery request from a designated user terminal, the server makes a request for paying a delivery deposit. When the designated user terminal pays the delivery deposit, the server controls the drone aboard the vehicle such that the drone flies to the delivery origin.

After the delivery deposit is paid, the drone flies and arrives at the delivery origin. The server uses a camera or a weight sensor with which the drone is equipped, so as to determine whether a packed package has a size or weight that the drone is able to deliver. When the package has a size or weight that the drone is unable to deliver, the customer is requested to repack the package. Herein, the delivery deposit is the cost of calling the drone. When the customer refuses to repack or cancels the delivery request, the server makes the drone return and does not return the paid delivery deposit to the customer. The server notifies the customer of the cost of calling in advance. For payment of the cost of calling, the customer is requested to apply for membership of the delivery service application and to register payment information.

In addition, according to an embodiment of the present invention, in the system for the delivery service using the drone, the server uses image data or weight data collected by the camera or the weight sensor of the drone so as to calculate a delivery cost of the package. The server requests the designated user terminal to pay the delivery cost. When the designated user terminal pays the delivery cost, the server controls the drone such that the drone picks up the package at the delivery origin. The larger the size of the package or the heavier the weight of the package, the more difficult it is for the drone to deliver the package and the longer delivery time it takes. The delivery cost is increased accordingly. Therefore, the server calculates the delivery cost at the picking up of the package by the drone and informs the customer about the delivery cost. Only when the customer accepts the delivery cost, the delivery cost is paid and the server makes the drone start delivery and the paid delivery deposit is returned to the customer as the drone is called. Since the drone does not perform delivery when the customer refuses to pay the delivery cost, the server makes the drone return and does not return the paid delivery deposit to the customer.

In the meantime, according to an embodiment of the present invention, in the system for the delivery service using the drone, when the drone finishes delivering the package to the delivery destination, the server controls the drone such that the drone boards a vehicle heading to an additional delivery origin positioned nearest to the delivery destination and travels, or such that the drone returns to a return place. The server controls the drone, which finishes delivering, such that the drone mounts or boards the vehicle or the bus heading to an additional delivery request place that is positioned nearest to the delivery destination. When there is no additional delivery request made nearby, the server conducts an analysis using big data and controls the drone such that the drone mounts or boards the vehicle or the bus having a path or a route that passes through a place where distribution is concentrated. When there is no vehicle or bus nearby having the path or the route that passes through the place where distribution is concentrated, the server controls the drone such that the drone mounts or boards the vehicle or the bus heading to a drone stop installed in the place where distribution is concentrated and the drone stands by at the drone stop.

In addition, the return place is the vehicle passing through the main point having many delivery requests or is the drone stop at the main point having many delivery requests. The battery of the drone may be charged at the return place. The roof of the vehicle or the bus and the drone stop are provided with charging facilities. When the drone mounts or boards, or when the drone lands, the drone uses the charging facility to charge the battery and prepares for the next delivery.

FIG. 2 is a flowchart illustrating a method for a delivery service using a drone according to an embodiment of the present invention. According to an embodiment of the present invention, a method for a delivery service using a drone includes receiving a delivery request by a server at step S100, picking up a package at a delivery origin by the drone at step S140, for example after completing steps S110, S120, and S130, boarding of the drone with the package that has been picked up, on a vehicle heading to a delivery destination at step S180, for example after completing steps S150 and S160, flying of the drone from the vehicle and delivering the package to the delivery destination by the drone at step S210. At the boarding of the drone with the package that has been picked up, on the vehicle heading to the delivery destination at step S180, the battery of the drone may be charged by the vehicle. In the event the package is determined to be not transportable (No at step S140) or the customer does not accept the cost for delivery (No at step S160), the package is unloaded at step S170, and the drone is directed to a vehicle for transport at step S230.

In addition, according to an embodiment of the present invention, in the method for the delivery service using the drone, at the boarding of the drone with the package that has been picked up, on the vehicle heading to the delivery destination at step S180, the drone may transfer to one or more vehicles and may travel. When direct delivery of the package is impossible (No at step S190), the server analyzes the predetermined path that the vehicle or the bus travels along, and the server controls the drone such that the drone transfers to one or more vehicles or buses and travels at step S200. When direct delivery of the package is possible (Yes at step S190), the drone takes off near the destination at step S210.

In the meantime, according to an embodiment of the present invention, the method for the delivery service using the drone may further include, after the flying of the drone from the vehicle at step S210 and the delivering of the package to the delivery destination by the drone at step S220, returning of the drone to a return place at steps S240 and S250 or steps S260 and S270 based on a determination at step S230. At the returning of the drone to the return place at steps S240 and S250 or steps S260 and S270, when there is an additional delivery request on the return path, the server controls the drone such that the drone performs an additional delivery immediately.

According to the embodiments of the present invention, the system and the method for the delivery service using the drone can deliver a package by using the drone in cooperation with the public transportation infrastructure, such as a bus, etc. In addition, compared to the conventional delivery service using a drone, the drone is mounted on the vehicle or the bus most of the time and is charged and travels, so that the drone is kept in a charged state and the distance that the drone flies is shortened. Accordingly, this may result in improvement to the durability of the drone and in reduction in safety problems for people caused by reckless flight of drones. Further, battery consumption can be reduced and a great number of deliveries can thus be handled.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system comprising:
    a server, comprising a computing system, configured to:
        store delivery information on a delivery, drone information regarding a drone to be used for the delivery, and vehicle information regarding a vehicle that the drone is to board;
        control the drone, through the delivery information, the drone information, and the vehicle information, to board and travel on the vehicle, or to depart the vehicle;
        make a request for paying a delivery deposit upon receiving a delivery request from a designated user terminal of a customer;
        control the drone aboard the vehicle to fly to a delivery origin after the delivery deposit is paid;
        use image data and weight data respectively collected by a camera and a weight sensor of the drone to calculate a delivery cost of a package, wherein the image data comprise information whether the package, based on its size, is deliverable by the drone;
        request to repack the package when it is determined that the drone is unable to deliver the package based on the collected image data and the collected weight data; and
        control the drone to return without returning the delivery deposit to the customer, according to a first implementation, when it is determined that the customer refuses to allow repacking or that the delivery request is cancelled.

2. The system of claim 1, wherein the server is configured to control the drone so that a battery of the drone is chargeable by the vehicle.

3. The system of claim 1, wherein, according to a second implementation, when the drone finishes delivering the package to a delivery destination, the server is configured to control the drone to return to a second vehicle so that a battery of the drone is chargeable at the second vehicle.

4. The system of claim 1, wherein the delivery information includes information on the delivery request, the package, the delivery origin, or a delivery destination.

5. The system of claim 1, wherein the drone information includes information on a position of the drone, a state of charge of a battery of the drone, a travel path of the drone, or whether the drone is aboard the vehicle.

6. The system of claim 1, wherein the vehicle information includes information on a position of the vehicle, a travel path of the vehicle, or whether the vehicle is boarded by the drone.

7. The system of claim 1, wherein, when the server receives the delivery request, the server is configured to direct the drone aboard the vehicle positioned nearest to the delivery origin.

8. The system of claim 1, wherein, according to a second implementation, after the drone picks up the package at the delivery origin, the server is configured to control the drone to board the vehicle heading to a delivery destination and travel on the vehicle.

9. The system of claim 1, wherein, according to a second implementation, the server is configured to control the drone to transfer to a second vehicle and travel on the second vehicle after the package is picked up by the drone.

10. The system of claim 1, wherein the server is configured to control the drone to board or depart the vehicle while the vehicle is stopped.

11. The system of claim 1, wherein, according to a second implementation, after the package is delivered to a delivery destination, the server is configured to control the drone to board a second vehicle heading to an additional delivery origin positioned nearest to the delivery destination and travel on the second vehicle.

12. The system of claim 1, wherein, according to a second implementation, when the drone finishes delivering the package to a delivery destination, the server is configured to control the drone to return to a return place.

13. The system of claim 12, wherein the return place is a second vehicle passing through a main point having many delivery requests or a drone stop at the main point having many delivery requests, and wherein a battery of the drone is chargeable at the return place.

* * * * *